United States Patent
Kim et al.

(10) Patent No.: US 11,472,490 B2
(45) Date of Patent: Oct. 18, 2022

(54) BODY FOR VEHICLE

(71) Applicants: Hyundai Motor Company, Seoul (KR); Kia Motors Corporation, Seoul (KR)

(72) Inventors: Byung Gyu Kim, Suwon-si (KR); Won Oh Kim, Ansan-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 254 days.

(21) Appl. No.: 16/929,604

(22) Filed: Jul. 15, 2020

(65) Prior Publication Data

US 2021/0171120 A1    Jun. 10, 2021

(30) Foreign Application Priority Data

Dec. 5, 2019    (KR) .................. 10-2019-0160983

(51) Int. Cl.
| | |
|---|---|
| *B62D 25/20* | (2006.01) |
| *B62D 25/04* | (2006.01) |
| *B62D 25/06* | (2006.01) |
| *B62D 21/11* | (2006.01) |
| *B62D 27/06* | (2006.01) |
| *B62D 21/02* | (2006.01) |

(52) U.S. Cl.
CPC ......... *B62D 25/2009* (2013.01); *B62D 21/02* (2013.01); *B62D 21/11* (2013.01); *B62D 25/04* (2013.01); *B62D 25/06* (2013.01); *B62D 25/2036* (2013.01); *B62D 27/06* (2013.01)

(58) Field of Classification Search
CPC .... B62D 25/2009; B62D 21/02; B62D 21/11; B62D 25/04; B62D 25/06; B62D 25/2036; B62D 27/06
USPC .......... 296/204, 193.07, 205, 187.08, 193.06
See application file for complete search history.

(56) References Cited

U.S. PATENT DOCUMENTS

| | | | |
|---|---|---|---|
| 4,325,448 A | 4/1982 | Pivar | |
| 4,660,345 A * | 4/1987 | Browning | B62D 21/08 164/63 |
| 5,209,541 A | 5/1993 | Janotik | |
| 5,332,281 A | 7/1994 | Janotik et al. | |

(Continued)

FOREIGN PATENT DOCUMENTS

| | | |
|---|---|---|
| DE | 102005026791 A1 | 1/2007 |
| EP | 1329374 A1 | 7/2003 |

(Continued)

OTHER PUBLICATIONS

U.S. Appl. No. 16/928,346.

(Continued)

*Primary Examiner* — D Glenn Dayoan
*Assistant Examiner* — E Turner Hicks
(74) *Attorney, Agent, or Firm* — Slater Matsil, LLP (57) ABSTRACT

A body for a vehicle includes a first member provided at a lower portion of a front floor module extending to a front of a second member provided at a center floor module, and a third member provided at a lower portion of a rear floor module extending to a rear of the second member provided at the center floor module to form a main load path along the first, second, and third members extending from a foremost end of the vehicle to a hindmost end of the vehicle.

20 Claims, 11 Drawing Sheets

(56) References Cited

U.S. PATENT DOCUMENTS

| | | | |
|---|---|---|---|
| 5,549,352 A | 8/1996 | Janotik et al. | |
| 5,829,219 A | 11/1998 | Sugawara et al. | |
| 6,022,070 A * | 2/2000 | Ashina | B62D 29/008 |
| | | | 296/205 |
| 6,042,163 A | 3/2000 | Reiffer | |
| 6,099,084 A | 8/2000 | Bungarten et al. | |
| 6,241,310 B1 | 6/2001 | Patelczyk | |
| 6,318,775 B1 | 11/2001 | Heatherington et al. | |
| 6,695,368 B1 | 2/2004 | Weykamp et al. | |
| 6,869,136 B2 | 3/2005 | Igarashi et al. | |
| 6,926,350 B2 | 8/2005 | Gabbianelli et al. | |
| 7,001,097 B2 | 2/2006 | Wang et al. | |
| 7,386,938 B2 | 6/2008 | Bruggemann et al. | |
| 7,758,107 B2 | 7/2010 | Ratsos et al. | |
| 8,371,642 B2 | 2/2013 | Baccouche et al. | |
| 8,517,423 B1 * | 8/2013 | Huston | B62D 21/183 |
| | | | 296/203.02 |
| 8,640,814 B2 * | 2/2014 | Deckard | B60N 2/38 |
| | | | 296/205 |
| 9,505,293 B2 | 11/2016 | Bowles et al. | |
| 9,849,920 B2 | 12/2017 | Kawata et al. | |
| 10,618,489 B2 * | 4/2020 | Hisamura | B60R 21/13 |
| 10,686,304 B2 | 6/2020 | Wagner, III | |
| 2001/0000119 A1 * | 4/2001 | Jaekel | B62D 23/005 |
| | | | 296/205 |
| 2006/0059807 A1 | 3/2006 | Zimmerman et al. | |
| 2006/0192375 A1 * | 8/2006 | Davis | B62D 23/005 |
| | | | 296/205 |
| 2009/0121106 A1 | 5/2009 | An | |
| 2013/0277137 A1 * | 10/2013 | Kawaguchi | B60K 1/00 |
| | | | 180/443 |
| 2015/0252586 A1 | 9/2015 | Schaefer | |
| 2015/0259011 A1 | 9/2015 | Deckard et al. | |
| 2015/0298739 A1 | 10/2015 | Buschjohann et al. | |
| 2017/0136874 A1 * | 5/2017 | Harris | B60G 3/145 |
| 2019/0208741 A1 | 7/2019 | Huthmaker et al. | |
| 2021/0171125 A1 * | 6/2021 | Yong | B62D 23/005 |

FOREIGN PATENT DOCUMENTS

| | | |
|---|---|---|
| FR | 2822431 A1 | 9/2002 |
| GB | 2508075 A | 5/2014 |
| JP | H0411581 A | 1/1992 |
| JP | 2013208968 A | 10/2013 |
| KR | 100243584 B1 | 3/2000 |
| KR | 20090035148 A | 4/2009 |
| WO | 2010071664 A1 | 6/2010 |

OTHER PUBLICATIONS

U.S. Appl. No. 16/929,663.
U.S. Appl. No. 16/929,426.
U.S. Appl. No. 16/989,326.
U.S. Appl. No. 16/928,511.
U.S. Appl. No. 16/928,381.
U.S. Appl. No. 16/931,189.

* cited by examiner

BODY FOR VEHICLE

CROSS-REFERENCE TO RELATED APPLICATIONS

This application claims priority to Korean Patent Application No. 10-2019-0160983, filed on Dec. 5, 2019, which application is hereby incorporated herein by reference.

TECHNICAL FIELD

The present disclosure relates to a body for a vehicle.

BACKGROUND

An existing body structure of compact cars is a monocoque body structure formed by cutting out a rear door part from a general vehicle design.

This, however, is a general monocoque body structure, and here, car bodies are produced by machining and welding parts through pressing using a mold, thus disadvantageously having a low design freedom based on a change in design in terms of the nature of an integrated body, as well as requiring large-scale investment facilities such as pressing plant, body welding plant, painting plant, and the like.

In addition, a significant design change is required for small quantity batch production or production through a smart factory, and as a result, the number of molds is significantly increased to incur a high production cost.

In addition, durability is weak compared to a frame body type, causing a problem in that the body is easily deformed in the occurrence of an accident to result in failure of ensuring overall rigidity.

Therefore, a new body structure which can be produced at a low cost in a smart factory environment, while allowing various designs, and which can efficiently disperse collision energy applied to the body in the occurrence of an accident is required.

The contents described as the related art have been provided only to assist in understanding the background of the present disclosure and should not be considered as corresponding to the related art known to those having ordinary skill in the art.

SUMMARY

The present disclosure relates to a body for a vehicle which is simplified in assembling and ensured in rigidity.

An embodiment of the present disclosure provides a body for a vehicle which simplifies assembling of a body to efficiently disperse collision energy applied to the body, while implementing a smart factory environment, to thus ensure rigidity.

According to an embodiment of the present disclosure, there is provided a body for a vehicle in which a member provided at a lower portion of a front floor module extends to the front of a member provided at a center floor module, and a member provided at a lower portion of a rear floor module extends to the rear of a member provided at the center floor module to form a main load path extending from the foremost to the hindmost of a vehicle by the members.

A center support member may be provided at the center floor module in a front-rear length direction, a front support member may be provided at a lower portion of the front floor module in the front-rear length direction, and a rear end of the front support member may be connected to a front end of the center support member, and a rear support member may be provided at a lower portion of the rear floor module in the front-rear length direction, and a front end of the rear support member may be connected to a rear end of the center support member.

The center support member, the front support member, and the rear support member may be provided on the same straight line in the same horizontal plane, and the main load path may be formed in a straight line.

A front cross connection member may be connected between front ends of pillar members on both sides extending from both sides of the front of the body to a roof side to form a first distribution load path extending from the front cross connection member to the pillar member.

A front cross connection member may be connected between front ends of pillar members on both sides extending from both sides of the front of the body to a roof side, one end of a suspension mounting member may be connected to both end portions of the front cross connection member in a front-rear direction, and the other end of the suspension mounting member may be connected to a side reinforcing member extending from both sides of the front of the body to both sides of the rear through a lower portion of both sides of the center to form a second distribution load path extending from the front cross connection member to the suspension mounting member and the side reinforcing member.

A pillar side module may be bolted to both sides of the center floor module to form a cabin module, a front floor module may be bolted to a lower portion of the front of the cabin module, and a rear floor module may be bolted to a lower portion of the rear of the cabin module.

A rigidity reinforcing member may be further fastened to a portion having weak rigidity among portions where modules are connected to each other.

DETAILED DESCRIPTION OF ILLUSTRATIVE EMBODIMENTS

Hereinafter, embodiments of the present disclosure are described in detail with reference to the accompanying drawings.

Figure 1:
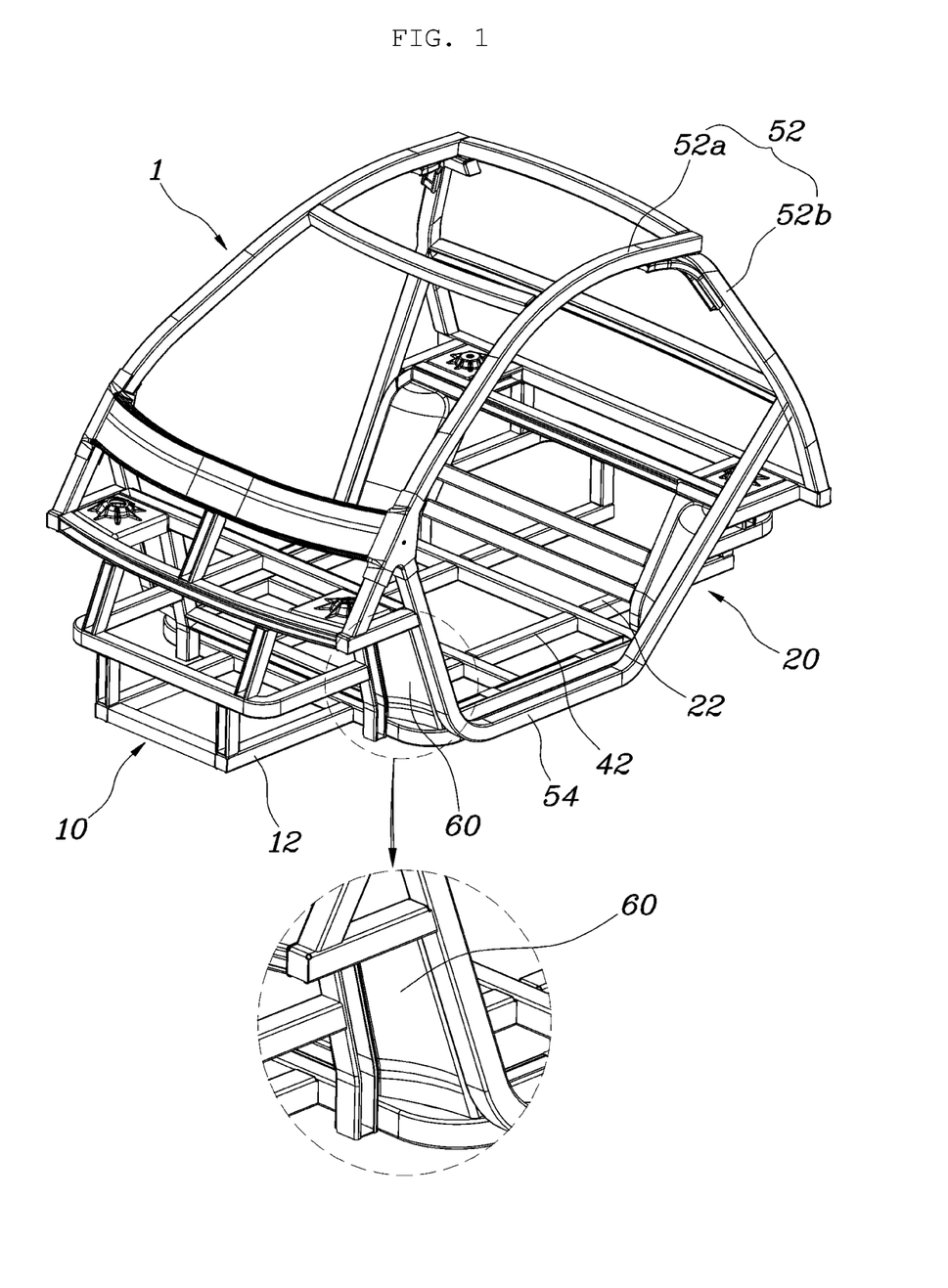
FIG. 1 is a view illustrating a body structure according to embodiments of the present disclosure.
Figure 2:
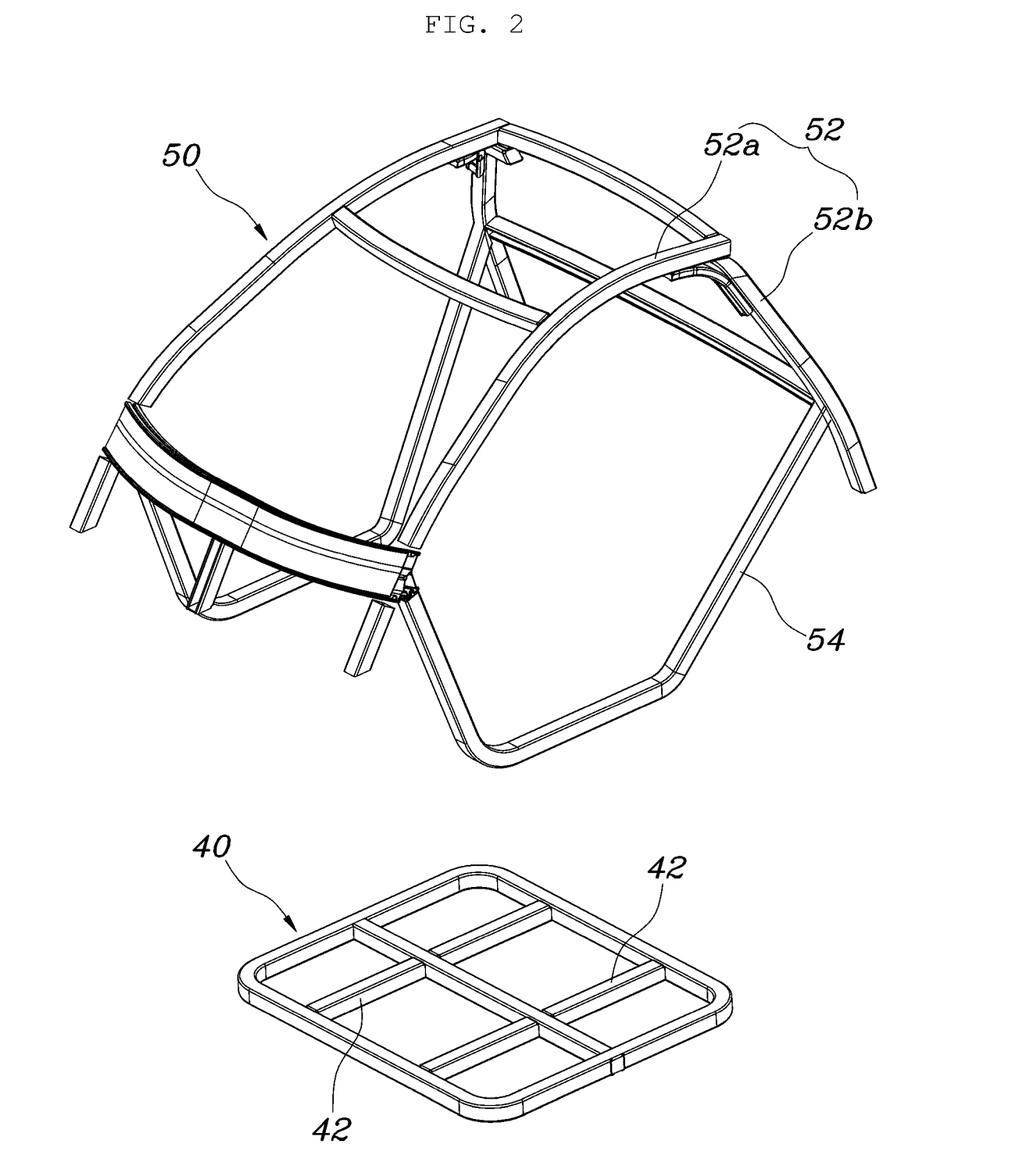
FIG. 2 is a view illustrating a separated pillar side module and a center floor module in a body structure according to embodiments of the present disclosure.
Figure 3:
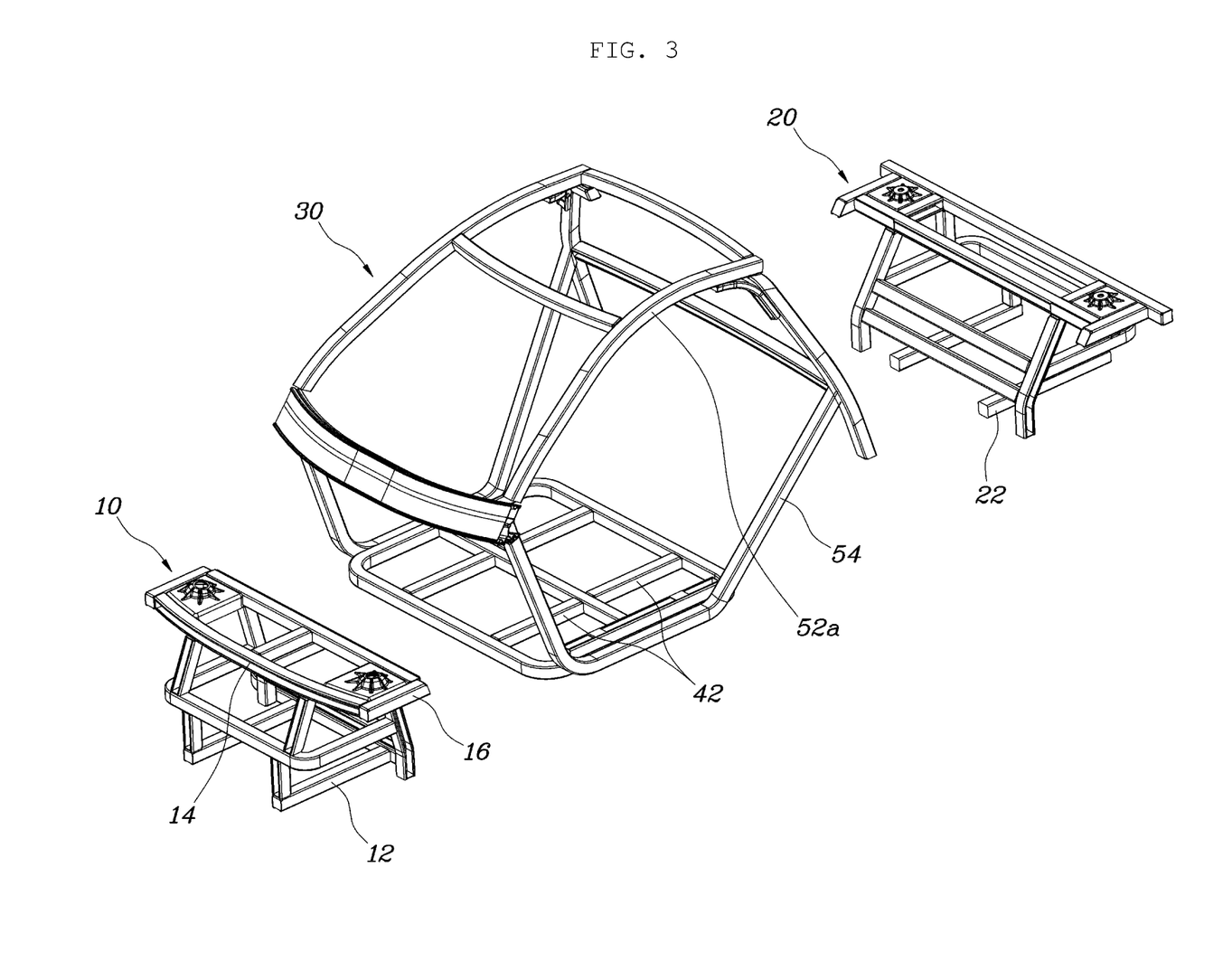
FIG. 3 is a view illustrating a separated cabin module and front and rear floor modules in a body structure according to embodiments of the present disclosure.

FIG. 1 is a view illustrating a body structure according to embodiments of the present disclosure, FIG. 2 is a view illustrating a separated pillar side module 50 and a center floor module 40 in the body structure according to embodiments of the present disclosure, FIG. 3 is a view illustrating a separated cabin module 30 and front and rear floor modules 10 and 20 in the body structure according to embodiments of the present disclosure.

The body 1 of the present disclosure is applicable to an ultra-compact electric vehicle, and multiple members are organically connected to form modules for each part, the modules being connected to form a body 1.

Referring to the drawings, the body 1 includes a front floor module 10, a center floor module 40, and a rear floor module 20, and the center floor module 40 is combined with a pillar side module 50 to configure a cabin module 30.

First, the front floor module 10 is provided at the front of the body 1 to support a front structure of the vehicle, the rear floor module 20 is provided at the rear of the body 1 to support a rear structure, and the center floor module 40 is connected between a lower portion of the front floor module 10 and a lower portion of the rear floor module 20 to support a lower portion of a passenger room.

The pillar side module 50 is connected to both sides of the center floor module 40 to configure the cabin module 30, and the pillar side module 50 is connected between an upper portion of the front floor module 10 and an upper portion of the rear floor module 20 to form an upper portion of the passenger room.

Here, the pillar side module 50 includes a pillar member 52 extending from the front on each side of the body 1 to the rear through an upper roof side and a side reinforcing member 54 extending from the front of each side of the body 1 to the rear through the lower center floor module 40. In this structure, a front end and a rear end of the side reinforcing member 54 is connected to a front middle portion and a rear middle portion of the pillar member 52, respectively.

Figure 4:
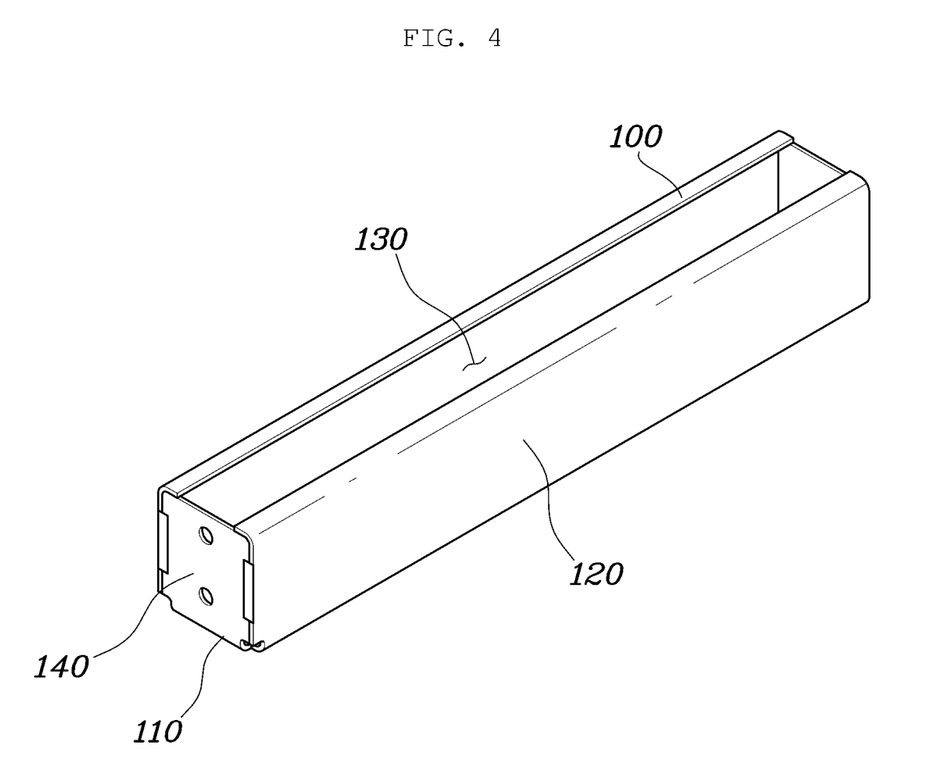
FIG. 4 is a view illustrating a shape and structure of members configuring a module of embodiments of the present disclosure.

FIG. 4 is a view illustrating a shape and structure of members configuring a module of embodiments of the present disclosure.

Referring to the drawings, the members configuring the module may be formed in a tubular shape having an open end structure with one side open.

The members include a fastening portion 140 having a shape to close an opening of the end, and the fastening portion 140 in surface-contact with another member 100 is fastened by a fastening member (not shown).

For example, the member 100 is formed such that a cross-section perpendicular to a length direction thereof has a "U" shape, three surfaces including a side connection portion no and side blocking portions 120 formed on both sides thereof, in a circumferential surface, are closed, and a side open portion 130 facing the side connection portion no is open.

The member 100 may preferably have a shape of a straight pipe formed in a length direction or may have a curved pipe in which a middle portion is bent in some cases. The member 100 may be short or long depending on a portion to which a member is applied.

The fastening portion 140 extends to an end portion of the side connection portion no facing the opened side open portion 130 of the member 100 and the extending fastening portion 140 is folded toward the opening to block the opening.

In addition, the fastening member may be a bolt/nut or a rivet, and a fastening hole may be provided in the fastening portion 140 and the bolt or rivet may penetrate through the fastening portion 140 to smoothly fasten the fastening portion 140.

That is, according to the configuration described above, in a state where an outer surface of the fastening portion 140 formed at one member 100 is in surface-contact with a side surface of another member, an in-line fastening operation is performed to insert a bolt and a tool through the open portion of the member 100 and tighten the bolt, thereby easily and simply coupling the members and enhancing assembling characteristics of the body 1.

In addition, since the members are assembled by a bolting or riveting method to configure the body 1, a large-scale pressing, body, welding, painting plant, and the like are unnecessary, thus appropriately coping with a smart factory environment, an assembling operation of the body 1 is simplified to improve assembling characteristics, and torsional rigidity of assembling portions is also significantly improved to ensure strength and rigidity of the body 1.

Figure 5:
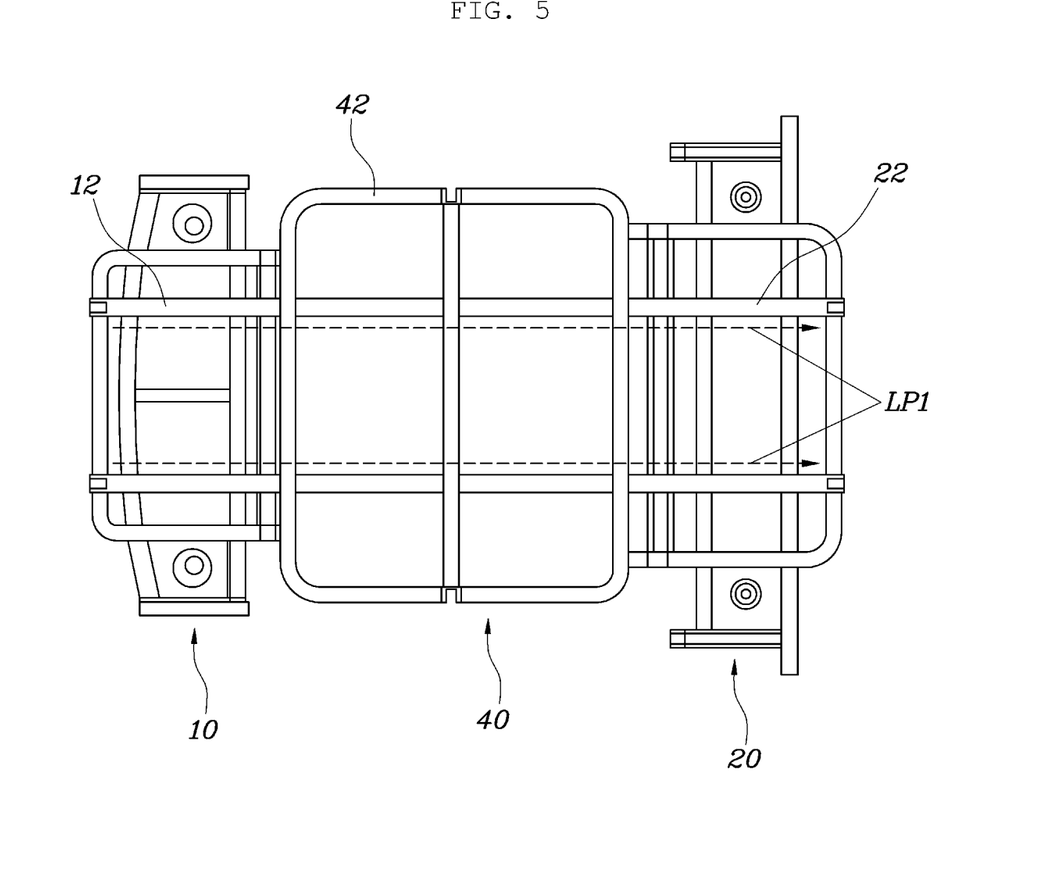
FIG. 5 is a view illustrating a main load path in a body structure according to embodiments of the present disclosure.

FIG. 5 is a view illustrating a main load path LP1 in the body 1 structure according to embodiments of the present disclosure.

Referring to FIG. 5, the member provided at a lower portion of the front floor module 10 is connected to the front portion of the member provided at the center floor module 40.

The member provided at a lower portion of the rear floor module 20 is connected to the rear of the member provided at the center floor module 40, and thus, the main load path LP1 extending from the foremost to the hindmost is formed by the members provided at a lower portion of the front floor module 10, the center floor module 40, and the rear floor module 20.

That is, while the parts of the body 1 are modularized and assembled, the load path is formed to extend from the front to the rear of the body 1, and thus, in the occurrence of a collision occurring at the front of the vehicle, collision energy applied to the front is not broken midway but is transferred to the rear along the load path, so as to be efficiently absorbed.

Figure 6:
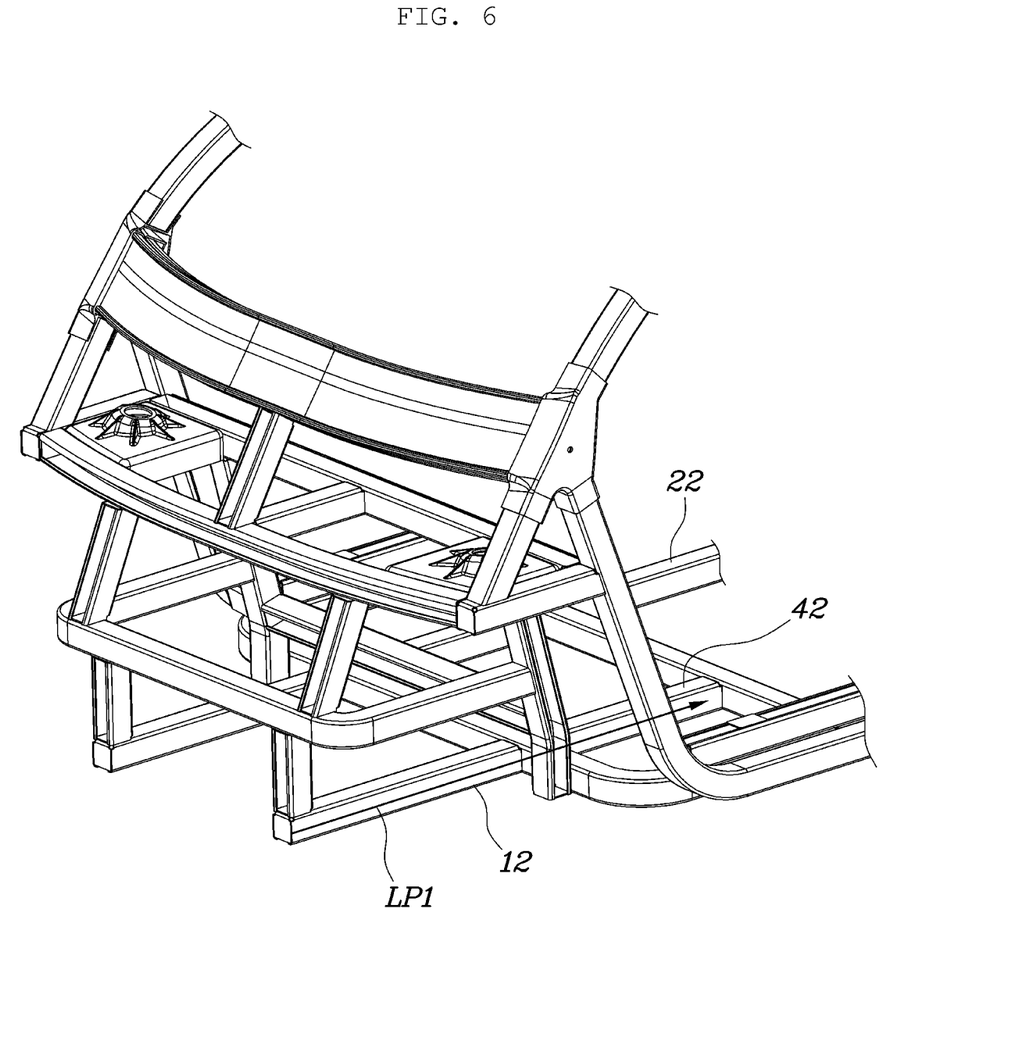
FIG. 6 is a view illustrating members forming a main load path of embodiments of the present disclosure.

FIG. 6 is a view illustrating members forming the main load path LP1 of embodiments of the present disclosure.

Referring to FIG. 6, a configuration of forming the main load path LP1 is as follows. The center support members 42 are provided on both sides of a lower portion of the center floor module 40 in a front-rear length direction, and front support members 12 are provided on both sides of a lower portion of the front floor module 10 in the front-rear length direction, whereby a rear end of the front support member 12 is connected to a front end of the center support member 42.

Here, the front support members 12 and the center support members 42 may be connected to each other with side surface portions of another member provided in a transverse direction therebetween, but, in this embodiment, the rear ends of the front support members 12 and the front ends of the center support members 42 are connected to each other in a facing manner, forming a structure in which the front support members 12 and the center support members 42 are connected to each other back and forth to transfer a load.

In addition, rear support members 22 are provided on both sides of a lower portion of the rear floor module 20 in a front-rear length direction and front ends of the rear support members 22 are connected to the rear ends of the center support members 42.

Here, the center support members 42 and the rear support members 22 may be connected to each other with side surface portions of another member provided in a transverse direction therebetween, but, in this embodiment, the rear ends of the center support members 42 and the front ends of the rear support members 22 are connected to each other in a facing manner, forming a structure in which the center support members 42 and the rear support members 22 are connected to each other in the front-rear direction to transfer a load.

In other words, the load path is formed from the front support members 12 at the foremost of the body 1 to the rear support members 22 located at the hindmost of the body 1 through the center support members 42, thereby improving absorption performance of collision energy applied to the front of the vehicle.

In particular, referring to FIGS. 1 and 6, in embodiments of the present disclosure, the center support members 42, the front support members 12, and the rear support members 22 are provided on the same straight line in the same horizontal plane, and thus, the main load path LP1 may be formed in a straight line.

In other words, since the center support members 42, the front support members 12, and the rear support members 22 are connected to each other back and forth on a straight line, the main load path LP1 may be connected from the foremost to the hindmost of the body 1 in the straight line, without being broken.

Figure 7:
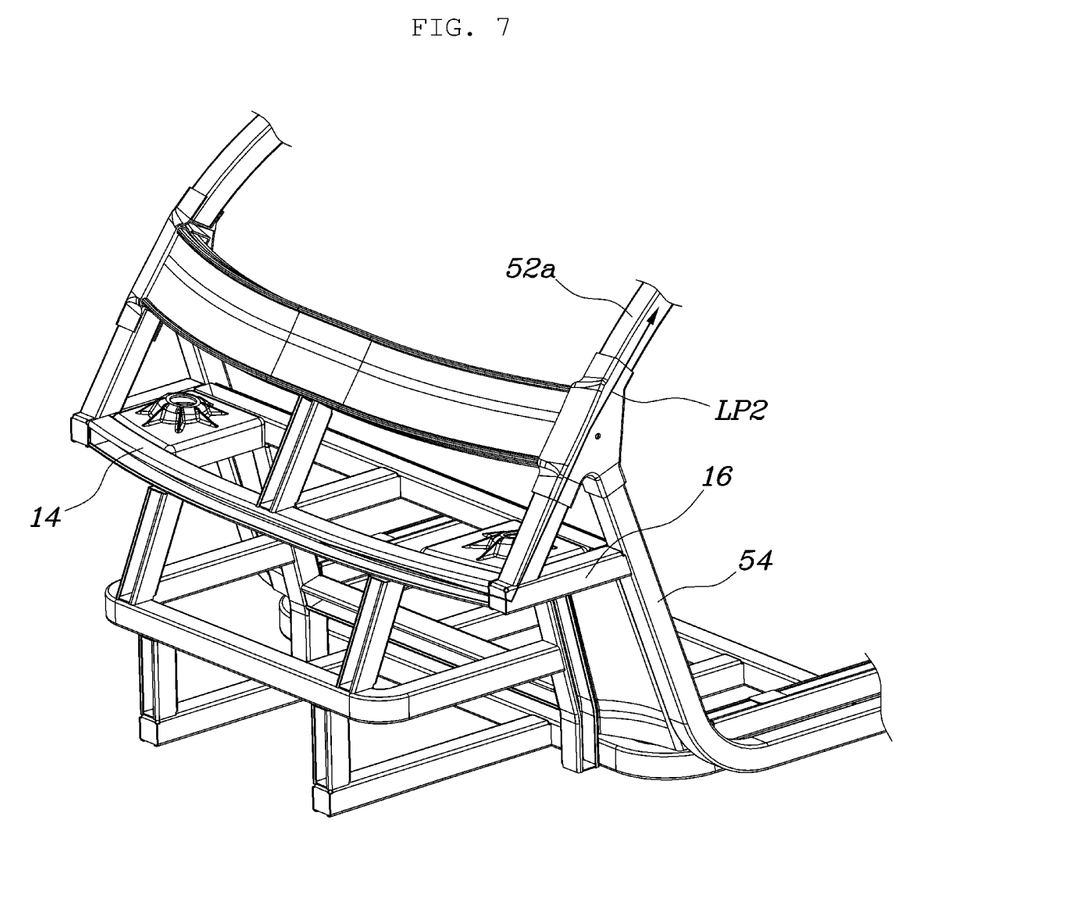
FIG. 7 is a view illustrating members forming a first distribution load path of embodiments of the present disclosure.

FIG. 7 is a view illustrating members forming a first distribution load path LP2 of embodiments of the present disclosure.

Referring to FIG. 7, a front cross connection member 14 is connected between the front ends of pillar members 52 on both sides extending from both sides of the front of the body 1 to a roof side to form the first distribution load path LP2 extending from the front cross connection member 14 to the pillar members 52.

For example, the front cross connection member 14 is provided in a left and right transverse direction on an upper front side of the front floor module 10, and front ends of the pillar members 52 are connected to both end portions of the front cross connection member 14. Preferably, front ends of suspension mounting members 16 formed in a front-rear direction are connected to both end portions of the front cross connection member 14, and the front ends of the pillar members 52 are connected to upper surfaces of the front ends of the suspension mounting members 16, thereby forming the first distribution load path LP2 extending from the front cross connection member 14 to front pillar members sea.

For reference, the pillar member 52 includes a front pillar member 52a formed in a direction of rising from the front of the vehicle to the roof side and a rear pillar member 52b formed in a direction rising from the rear of the vehicle to the roof side and connected to the front pillar member 52a, and a front end of the front pillar member 52a is connected to the suspension mounting member 16.

In other words, in the case of the body 1 having a small size, the side portion of the body 1 may be disadvantageous in a collision situation, and thus, the path in which the load is distributed may be additionally provided in addition to the main load path LP1, thereby efficiently dispersing and absorbing collision energy transferred to the body 1 to effectively reduce the collision energy transferred to an occupant.

Here, the connection member described later, including the front cross connection member 14, may be input to connect the main members or other connection members forming the frame of the vehicle, to the part for the assembly of chassis/interior/exterior parts, or input to the part where local rigidity reinforcement is needed.

Figure 8:
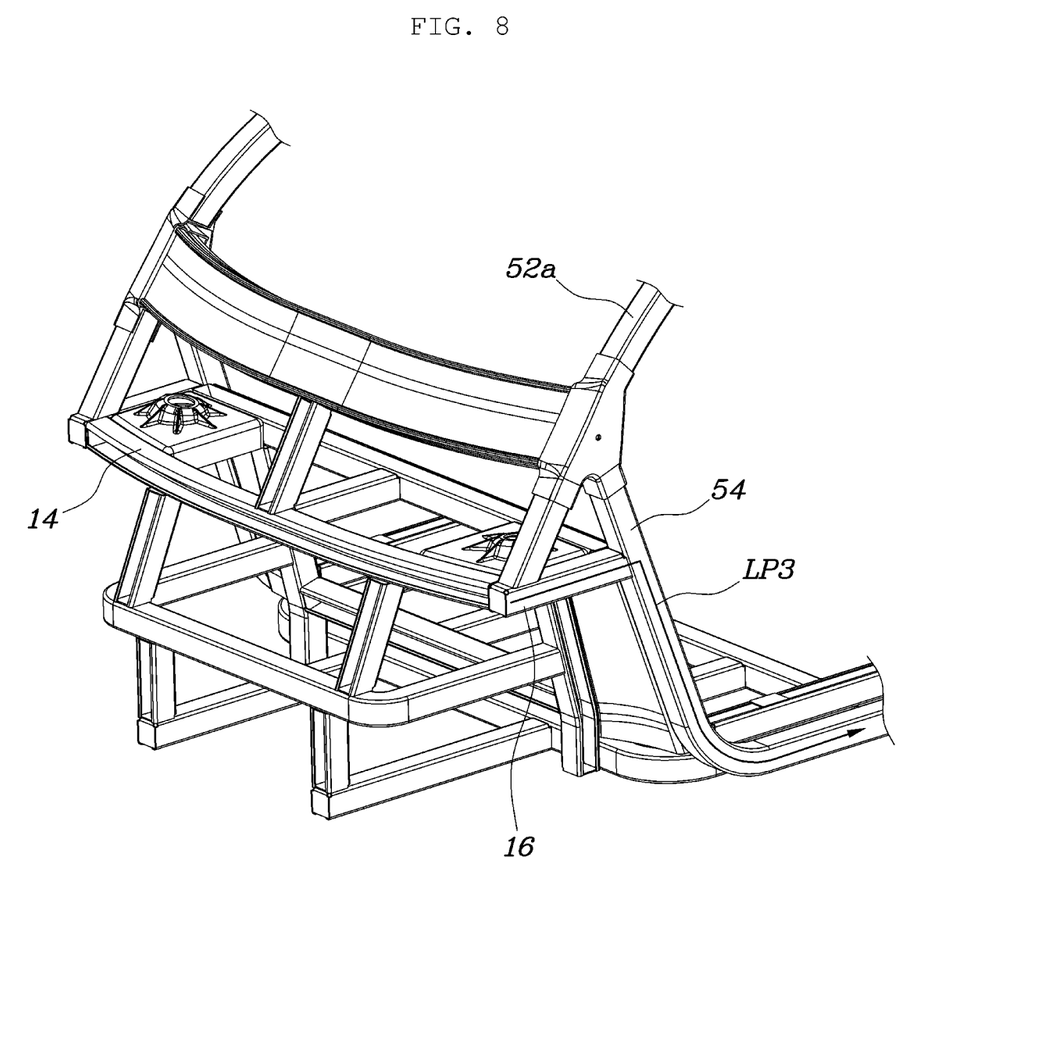
FIG. 8 is a view illustrating the members forming a second distribution load path of embodiments of the present disclosure.

FIG. 8 is a view illustrating members forming a second distribution load path LP3 of the present disclosure.

Referring to FIG. 8, the front cross connection member 14 is connected between the front ends of the pillar members 52 extending from the front on both sides of the body 1 to the roof side, and front ends of the suspension mounting members 16 are connected to both end portions of the front cross connection member 14 in a front-rear direction.

Also, the rear ends of the suspension mounting members 16 are connected to the side reinforcing members 54 extending from both sides of the front of the body 1 to both sides of the rear through the center of both sides of the body 1 to form the second distribution load path LP3 extending from the front cross connection member 14 to the suspension mounting members 16 and the side reinforcing members 54.

For example, the front ends of the suspension mounting members 16 formed in a front-rear direction are connected to both end portions of the front cross connection member 14, and the front end of the front pillar member 52a is connected to an upper surface of the front surface of the front end of the suspension mounting member 16.

Also, the front end of the side reinforcing member 54 is connected to a middle point of the front pillar member 52a adjacent to the front end of the front pillar member 52a, formed in a direction descending to the rear side, and connected to a side surface of the center floor module 40.

In particular, the rear end of the suspension mounting member 16 is connected to the middle point of the side reinforcing member 54 adjacent to the front end of the side reinforcing member 54, thereby forming the second distribution load path LP3 extending from the front cross connection member 14 to the side reinforcing member 54 through the suspension mounting member 16.

In other words, as described above, in the case of the body 1 having a small size, the side portion of the body 1 may be disadvantageous in a collision situation, and thus, the path in which the load is distributed may be additionally provided in addition to the main load path LP1, thereby efficiently dispersing and absorbing collision energy transferred to the body 1 to effectively reduce the collision energy transferred to an occupant.

Meanwhile, referring to FIGS. 1 through 3, the pillar side module 50 is bolted to both sides of the center floor module 40 to configure the cabin module 30.

Also, the front floor module 10 is bolted to a front lower portion of the cabin module 30, and the rear floor module 20 is bolted to a rear lower portion of the cabin module 30.

As described above, in embodiments of the present disclosure, the parts of the body 1 configure modules and enter a factory and the modules are bolted and assembled to configure the body 1, thus eliminating the necessity of a pressing facility, a welding facility, a painting facility, and the like, whereby the body 1 may be appropriate for implementing in a smart factory environment and manufactured at a low cost.

In addition, instead of the existing coupling method of welding linear portions where the members meet, in embodiments of the present disclosure, the members in surface-contact are coupled by a bolting method, thus increasing torsional rigidity of the connection portions between the members to improve overall strength and rigidity of the body 1.

Subsequently, referring to FIG. 1, in embodiments of the present disclosure, a rigidity reinforcing member 60 may further be fastened to a weak portion of the connection portion among the portions where the modules are connected to each other, to reinforce rigidity of the weak portion of the connection portion in the load path.

For example, the rigidity reinforcing member 60 is preferably a tubular reinforcing member connected to each of two members connected to each other at both end portions thereof to bridge the two members or may be a reinforcing panel having a panel shape to block a space formed as the members are connected to each other, and the rigidity reinforcing member 60 may be bolted to the members.

Here, the reinforcing member as the rigidity reinforcing member 60 may be the member illustrated in FIG. 4, and a middle portion thereof may be bent.

In addition, in embodiments of the present disclosure, when a full length, a full width, wheelbase, and the like, are to be modified, only lengths of some members configuring the modules may be modified.

That is, in the case of modifying the full length, the full length may be modified by modifying lengths of the members of the front floor module 10 or the rear floor module 20 in a front-rear direction.

Also, in the case of modifying the full width, the full width may be modified by modifying the lengths of the members of the center floor module 40 connected in a left-right direction, and in the case of modifying the wheel base, the length of the wheel base may be modified by modifying lengths of the members of the center floor module 40 connected in the front-rear direction.

Therefore, in the case of modifying the numerical indicators such as the full width, the full length, the wheel base, and the like, only the lengths of the major parts in each module, rather than many parts, may be modified, thereby facilitating coping with a change in various designs and minimizing modified parts to manufacture the body 1 at a low cost.

Figure 9:
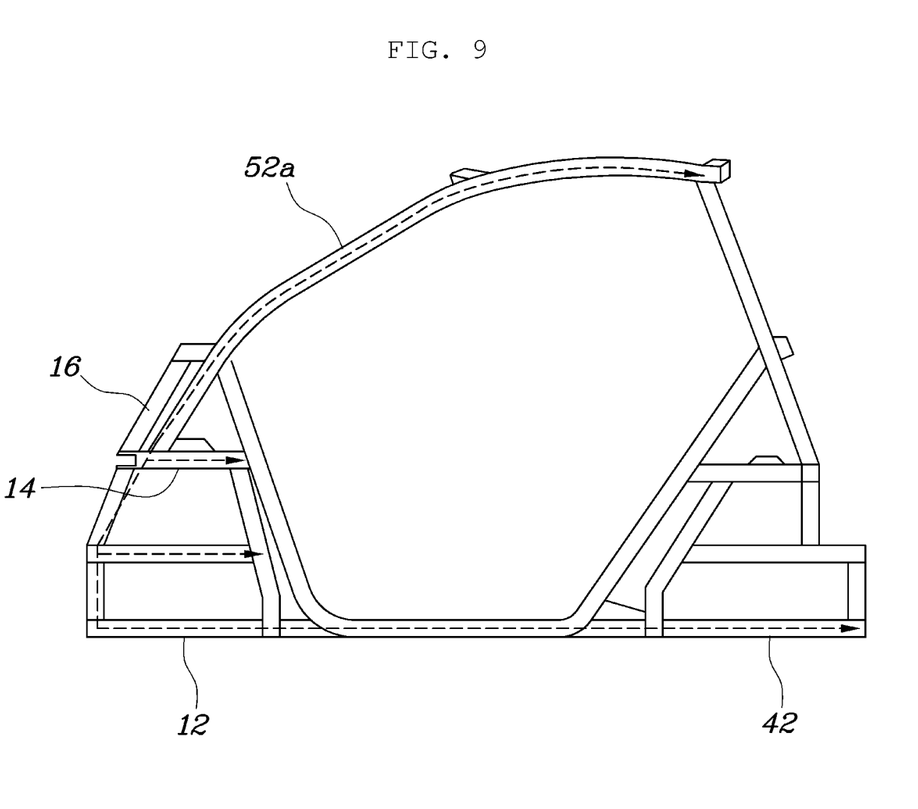
FIGS. 9 through 11 are views illustrating an effect in which collision energy applied to the front of the vehicle is dispersed along a load path in embodiments of the present disclosure.
Figure 10:
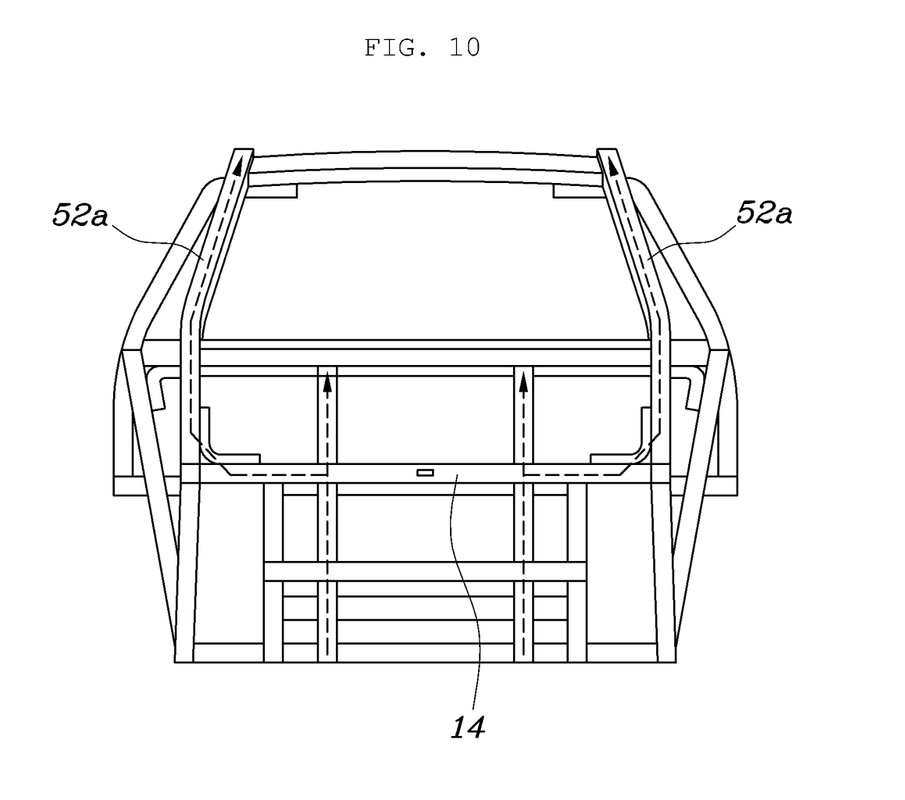
Figure 11:
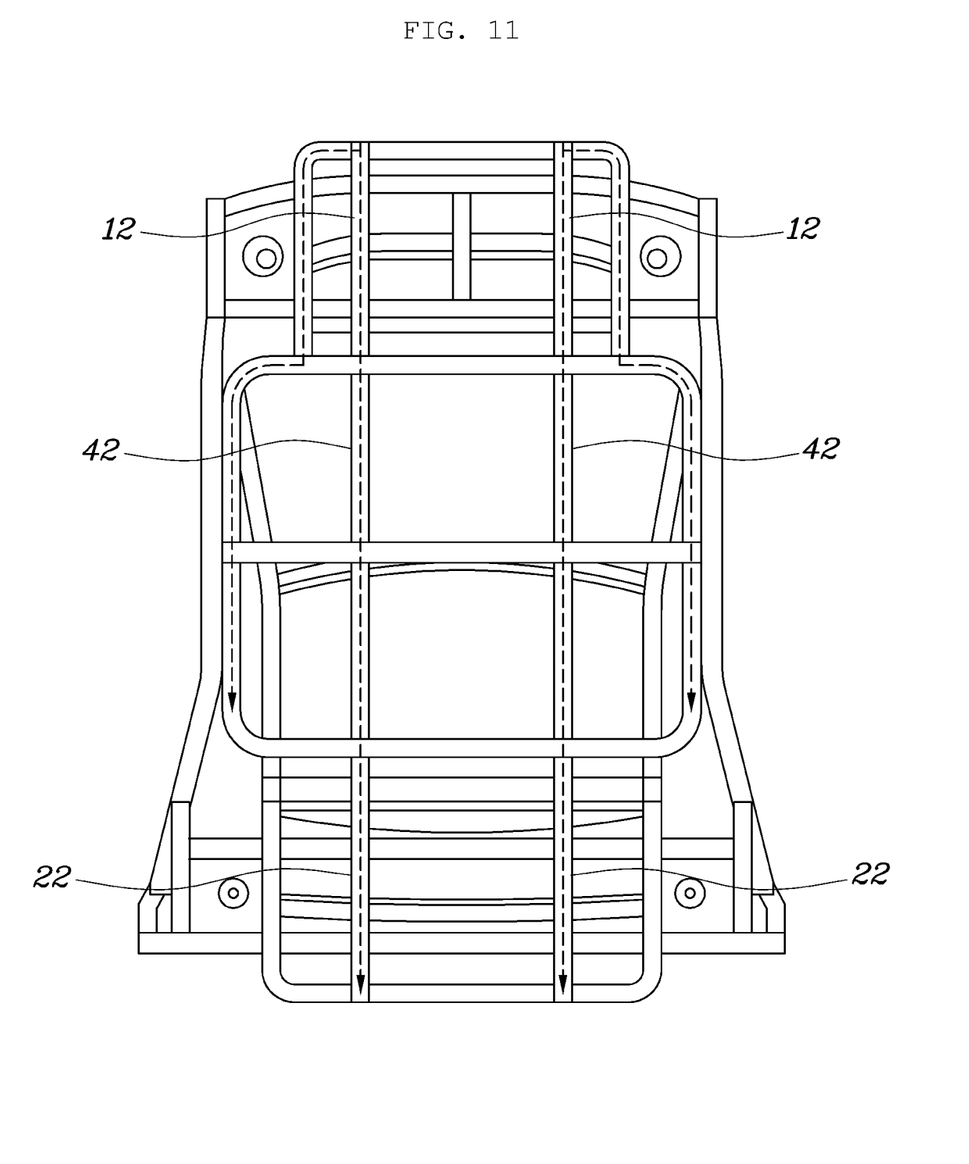

FIGS. 9 through 11 are views illustrating an effect in which collision energy applied to the front of a vehicle is dispersed along a load path in the present disclosure.

Referring to FIGS. 9 through 11, when a collision load is input to the front of the vehicle, collision energy is transferred along the main load path LP1 extending to the center support member 42 and the rear support member 22 through the front support member 12, thus absorbing and reducing impact energy.

In addition, impact energy may be transferred through the member extending in an up-down direction between the front end of the front support member 12 and the front cross connection member 14 and distributed to the first distribution load path LP2 extending from the front cross connection member 14 to the side reinforcing member 54 through the suspension mounting member 16 and the second distribution load path LP3 extending to the front pillar member 52a, thereby further reliably absorbing and reducing the impact energy.

In addition, the impact energy is also dispersed to the member configuring the edge of the center floor module 40 so as to be absorbed and reduced, while the impact energy is transferred from the front support member 12 to the center support member 42.

As described above, in embodiments of the present disclosure, since the load paths for dispersing the collision energy applied to the body 1 due to a collision of the vehicle are formed in various directions, the collision energy may be efficiently dispersed and absorbed, and thus, the collision energy transferred to the occupant may be effectively reduced.

In addition, since the members configuring each module, as well as the modules configuring the parts of the body, are assembled by the bolting or riveting method to configure the body, a large-scale pressing, body, welding, painting process, and the like, are not necessary, appropriately coping with the smart factory environment, and since the assembling operation of the body is simplified, assembling characteristics may be improved and torsional rigidity of the assembled parts may be significantly improved to increase strength and rigidity of the body.

Although the present disclosure has been shown and described with respect to specific embodiments, it will be apparent to those having ordinary skill in the art that the present disclosure may be variously modified and altered without departing from the spirit and scope of the present disclosure as defined by the following claims.

What is claimed is:

1. A body for a vehicle, the body comprising:
 a first member provided at a lower portion of a front floor module extending to a front of a second member provided at a center floor module;
 a third member provided at a lower portion of a rear floor module extending to a rear of the second member provided at the center floor module to form a main load path along the first, second, and third members extending from a foremost end of the vehicle to a hindmost end of the vehicle;
 pillar members extending from both sides of a front of the body to a roof side;
 a front cross connection member connected between front ends of both pillar members to form a first distribution load path extending from the front cross connection member to each of the pillar members; and
 a suspension mounting member having a first end connected to both end portions of the front cross connection member in a front-rear direction and a second end connected to a side reinforcing member extending from both sides of the front of the body to both sides of a rear of the body through a lower portion of both sides of a center of the body to form a second distribution load path extending from the front cross connection member to the suspension mounting member and the side reinforcing member.

2. The body of claim 1, wherein:
 the second member comprises a center support member provided at the center floor module in a front-rear length direction of the vehicle;
 the first member comprises a front support member provided at the lower portion of the front floor module in the front-rear length direction, a rear end of the front support member connected to a front end of the center support member; and
 the third member comprises a rear support member provided at the lower portion of the rear floor module in the front-rear length direction, a front end of the rear support member connected to a rear end of the center support member.

3. The body of claim 2, wherein the center support member, the front support member, and the rear support member are provided on a same straight line in a same horizontal plane, and the main load path is formed in a straight line.

4. The body of claim 1, further comprising:
 a pillar side module bolted to both sides of the center floor module to form a cabin module;
 the front floor module bolted to a lower portion of a front of the cabin module; and
 the rear floor module bolted to a lower portion of a rear of the cabin module.

5. The body of claim 4, further comprising a rigidity reinforcing member fastened to a portion having weak rigidity among portions where the modules are connected to each other.

6. A body for a vehicle, the body comprising:
a center support member provided at a center floor module in a front-rear length direction of the vehicle;
a front support member provided at a lower portion of a front floor module in the front-rear length direction, a rear end of the front support member connected to a front end of the center support member;
a rear support member provided at a lower portion of a rear floor module in the front-rear length direction, a front end of the rear support member connected to a rear end of the center support member;
pillar members extending from both sides of a front of the body to a roof side;
a front cross connection member connected between front ends of both pillar members to form a first distribution load path extending from the front cross connection member to each of the pillar members;
a side reinforcing member extending from both sides of the front of the body to both sides of a rear of the body through a lower portion of both sides of a center of the body; and
a suspension mounting member having a first end connected to both end portions of the front cross connection member in a front-rear direction and a second end connected to the side reinforcing member to form a second distribution load path extending from the front cross connection member to the suspension mounting member and the side reinforcing member.

7. The body of claim 6, wherein a main load path is provided along the center support member, the front support member, and the rear support member extending from a front end of the vehicle to a rear end of the vehicle.

8. The body of claim 6, further comprising:
a pillar side module bolted to both sides of the center floor module to form a cabin module;
the front floor module bolted to a lower portion of a front of the cabin module; and
the rear floor module bolted to a lower portion of a rear of the cabin module.

9. The body of claim 8, further comprising a rigidity reinforcing member fastened to a portion where the pillar side module is connected to the center floor module, a portion where the front floor module is connected to the cabin module, or a portion where the rear floor module is connected to the cabin module.

10. The body of claim 9, wherein a cross-section perpendicular to a length direction of the rigidity reinforcing member has a "U" shape.

11. A body for a vehicle, the body comprising:
a center floor module comprising center support members provided on each side of the vehicle in a front-rear length direction of the vehicle;
a front floor module comprising front support members provided on each side of the vehicle at a lower portion of the front floor module, respective rear ends of the front support members connected to respective front ends of the center support members;
a rear floor module comprising rear support members provided on each side of the vehicle at a lower portion of the rear floor module in the front-rear length direction, respective front ends of the rear support members connected to respective rear ends of the center support members;
pillar side modules coupled to each side of the center floor module, each pillar side module comprising:
pillar members extending from a front of each side of the body to a rear of each side of the body through an upper roof side of the body; and
side reinforcing members extending from the front of each side of the body to the rear of each side of the body through a lower portion of the center floor module, front ends of the side reinforcing members connected to front middle portions of the pillar members, and rear ends of the side reinforcing members connected to rear middle portions of the pillar members.

12. The body of claim 11, further comprising main load paths extending from the front of each side of the body to the rear of each side of the body along the front support members, the center support members, and the rear support members on each side of the body.

13. The body of claim 11, further comprising a front connection member connected between the front ends of the pillar members in a direction transverse to the front-rear length direction of the vehicle, wherein first distribution load paths are formed extending from the front cross connection member to each of the pillar members.

14. The body of claim 13, further comprising suspension mounting members formed on each side of the vehicle in the front-rear length direction of the vehicle, front ends of the suspension mounting members connected to respective ends of the front cross connection member, wherein the front ends of the pillar members are connected to respective upper surfaces of the front ends of the suspension mounting members, and wherein second distribution load paths are formed extending from the front cross connection member to each of the pillar members.

15. The body of claim 4, wherein:
the second member comprises a center support member provided at the center floor module in a front-rear length direction of the vehicle;
the first member comprises a front support member provided at the lower portion of the front floor module in the front-rear length direction, a rear end of the front support member connected to a front end of the center support member; and
the third member comprises a rear support member provided at the lower portion of the rear floor module in the front-rear length direction, a front end of the rear support member connected to a rear end of the center support member.

16. The body of claim 15, wherein the center support member, the front support member, and the rear support member are provided on a same straight line in a same horizontal plane, and the main load path is formed in a straight line.

17. The body of claim 5, wherein:
the second member comprises a center support member provided at the center floor module in a front-rear length direction of the vehicle;
the first member comprises a front support member provided at the lower portion of the front floor module in the front-rear length direction, a rear end of the front support member connected to a front end of the center support member; and
the third member comprises a rear support member provided at the lower portion of the rear floor module in the front-rear length direction, a front end of the rear support member connected to a rear end of the center support member.

18. The body of claim 17, wherein the center support member, the front support member, and the rear support member are provided on a same straight line in a same horizontal plane, and the main load path is formed in a straight line.

19. The body of claim 8, wherein a main load path is provided along the center support member, the front support member, and the rear support member extending from a front end of the vehicle to a rear end of the vehicle.

20. The body of claim 13, further comprising main load paths extending from the front of each side of the body to the rear of each side of the body along the front support members, the center support members, and the rear support members on each side of the body.

* * * * *